(No Model.)
R. M. HUNTER.
ELECTRICALLY PROPELLED CAR.
No. 446,817. Patented Feb. 17, 1891.
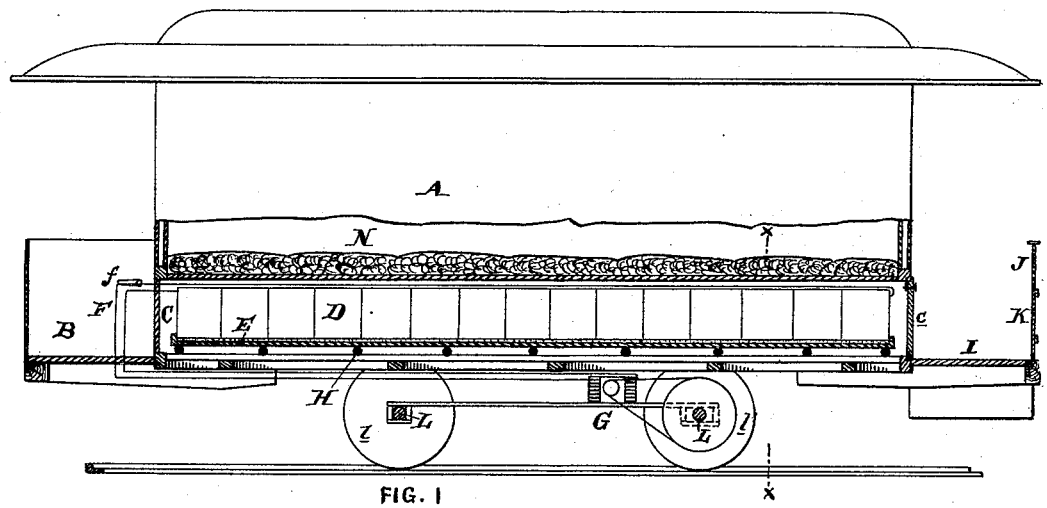
FIG. 1
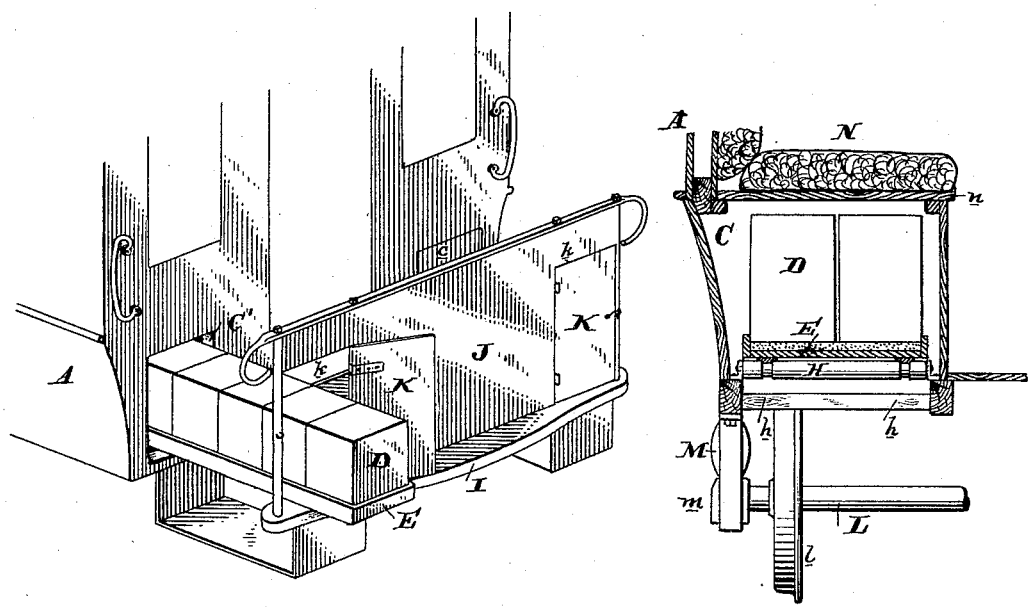
FIG. 3
FIG. 2
Attest:
Henry Drury
David S. Williams
Inventor:

UNITED STATES PATENT OFFICE.

RUDOLPH M. HUNTER, OF PHILADELPHIA, PENNSYLVANIA.

ELECTRICALLY-PROPELLED CAR.

SPECIFICATION forming part of Letters Patent No. 446,817, dated February 17, 1891.

Application filed March 14, 1889. Serial No. 303,198. (No model.)

*To all whom it may concern:*

Be it known that I, RUDOLPH M. HUNTER, of the city and county of Philadelphia, and State of Pennsylvania, have invented an Improvement in Electrically-Propelled Cars, (Case 88,) of which the following is a specification.

My invention has reference to electrically-propelled cars; and it consists of certain improvements, which are fully set forth in the following specification, and shown in the accompanying drawings, which form a part thereof.

This application (Case 88) has particular reference to the invention set out in Letters Patent No. 384,576, granted to me on June 12, 1888. In that application I covered, broadly, the construction of an electric car with longitudinal compartments under the seats and having openings in its end or ends, and through which openings the slide or plank supporting the secondary or other batteries is passed in inserting and removing the batteries with reference to the compartment.

In my present application I provide the dasher or guard of the car with apertures or cut-away portions and furnish such apertures or cut-away portions with doors or covers. By opening the doors in the dasher or guard, and also the doors or covers to the compartment, the long battery-slide can be inserted or removed. I have found this construction excellent in practice and employ it as the standard construction, having first fully embodied it in a car in the year 1887.

In the drawings, Figure 1 is a side elevation of an electric car embodying my invention with part cut away to show the batteries. Fig. 2 is a cross-section of same on line *x x*, and Fig. 3 is a perspective view of the end of a car embodying my improvement, and showing the battery slide or plank with its batteries in process of being inserted into the compartment under the seat.

A is the car-body.
B is the front platform.
I is the rear platform.
J is the dasher or guard for platform I.
C is the compartment under the seats N, and C' is the opening thereto from platform I.
c is the door or cover to said opening.

H are rollers within the compartment D for supporting the battery-slide E.

k are the openings or cut-away portions of the guard or dasher, and K are doors or covers therefor. The openings k are in line with the openings C' of the compartment C.

E is one of the long slides or planks upon which the batteries D are placed and permanently coupled. This slide or plank with its batteries is run bodily into and out of the compartment on the car and is moved over the platform and through the dasher or guard, as shown, Fig. 3. When this operation is being performed, the doors K are opened or moved back, and when the slide is in place and the car ready to run the doors c and K are both closed.

G is the electric motor for driving the car.
F is the motor-circuit connecting with the battery D, and may have a switch *f* of suitable construction.

L is the axles, and *l* the car-wheels. The axles work in boxes *m* in the usual way and the car-body rests upon springs M. (See Fig. 2.) The space at the bottom of the compartment C may be braced by cross-bars *h*.

I do not limit myself to any specific details of construction of the various parts, as they may be varied to suit the particular style of car constructed.

Having now described my invention, what I claim as new, and desire to secure by Letters Patent, is—

1. A car having longitudinally-arranged seats, end dashers, openings in one of the car-body ends and in the dasher adjacent thereto in line with the spaces below said seats, and doors or covers for said openings in the car end and dasher for effecting the transfer of storage-batteries to and from the car, substantially as set forth.

2. A car having longitudinally-arranged seats, end dashers, openings in one of the car-body ends and in the dasher adjacent thereto in line with the spaces below the seats, and doors or covers for the openings in said car-body end and dasher, in combination with a removable platform or plank E, substantially as set forth.

3. A car having end platforms, dashers thereon, longitudinally-arranged seats with spaces between the seats and the car-floor, and openings in one end of the car and in one of the dashers in line with said seat-spaces for effecting transfer of storage-batteries to and from said seat-spaces across the end platform, substantially as set forth.

4. A car having openings in one of its ends, removable doors or covers therefor, and removable or hinged dasher-sections in line with said doors, substantially as set forth.

5. A car having longitudinally-arranged seats, end dashers, guideways on the floor below said seats, and openings in one end of the car and in one of the dashers in line with the space below the seats, in combination with movable planks or platforms E, adapted to said guideways, substantially as set forth.

In testimony of which invention I hereunto set my hand.

RUDOLPH M. HUNTER.

Witnesses:
ERNEST HOWARD HUNTER,
E. M. BRECKINREED.